(12) United States Patent
Eberle et al.

(10) Patent No.: US 9,919,246 B2
(45) Date of Patent: *Mar. 20, 2018

(54) FILTER DEVICE WITH RELEASABLY SECURABLE END CAP AND SEALING ARRANGEMENT

(71) Applicant: HYDAC FILTERTECHNIK GMBH, Sulzbach/Saar (DE)

(72) Inventors: Richard Eberle, Ornesheim (DE); Micha Kreibig, Rehlingen-Siersburg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 84 days.

This patent is subject to a terminal disclaimer.

(21) Appl. No.: 15/063,593

(22) Filed: Mar. 8, 2016

(65) Prior Publication Data

US 2016/0184750 A1 Jun. 30, 2016

Related U.S. Application Data

(63) Continuation of application No. 13/261,414, filed as application No. PCT/EP2011/001012 on Mar. 2, 2011, now Pat. No. 9,314,720.

(30) Foreign Application Priority Data

Mar. 4, 2010 (DE) .................. 10 2010 010 304

(51) Int. Cl.
*B01D 27/00* (2006.01)
*B01D 35/00* (2006.01)
(Continued)

(52) U.S. Cl.
CPC ........... *B01D 29/23* (2013.01); *B01D 35/005* (2013.01); *B01D 35/153* (2013.01); *B01D 35/16* (2013.01);
(Continued)

(58) Field of Classification Search
CPC ........ B01D 21/24; B01D 24/38; B01D 25/30; B01D 27/00; B01D 27/08; B01D 29/0036;
(Continued)

(56) References Cited

U.S. PATENT DOCUMENTS

| 7,335,300 B1 | 2/2008 | Stamey, Jr. et al. |
| 2008/0110815 A1 | 5/2008 | Stamey et al. |
| 2009/0050554 A1 | 2/2009 | Shaam |

FOREIGN PATENT DOCUMENTS

| DE | 195 38 883 | 4/1997 |
| DE | 100 64 482 | 7/2002 |

(Continued)

*Primary Examiner* — Dirk Bass
*Assistant Examiner* — Hayden Brewster
(74) *Attorney, Agent, or Firm* — Wenderoth, Lind & Ponack, L.L.P.

(57) ABSTRACT

A filter device for fluids with a fluid inlet (14) and a fluid outlet (24). A filter element (9) is enclosed by an end cap (21) on its lower end facing a bottom part (5) of the filter housing (1). The end cap has a passage (29) forming a fluid connection to the filter element inner filter cavity (17) and can be fixed to an element retainer (23) of the filter housing (1). The element retainer (23) includes a retaining piece (35) open towards the filter element (9) with a fluid channel (37) leading to a housing connection (24). The end cap (21) has a connecting piece (27) in the retaining piece (35). The retaining piece (35) forms an opening (43) connected to the fluid channel (37) leading to the element retainer (23). A sealing (45, 47) seals the opening from the open end of the retaining piece.

10 Claims, 2 Drawing Sheets

(51) Int. Cl.

| | |
|---|---|
| *B01D 35/28* | (2006.01) |
| *B01D 35/153* | (2006.01) |
| *B01D 29/23* | (2006.01) |
| *B01D 35/16* | (2006.01) |
| *B01D 36/00* | (2006.01) |
| *B01D 35/30* | (2006.01) |
| B01D 29/00 | (2006.01) |
| B01D 21/24 | (2006.01) |
| B01D 24/38 | (2006.01) |
| B01D 25/30 | (2006.01) |
| B01D 29/58 | (2006.01) |
| B01D 29/11 | (2006.01) |
| F02M 37/22 | (2006.01) |

(52) U.S. Cl.
CPC ........... *B01D 35/30* (2013.01); *B01D 35/306* (2013.01); *B01D 36/003* (2013.01); *F02M 37/22* (2013.01); B01D 29/117 (2013.01); B01D 29/58 (2013.01); B01D 2201/295 (2013.01); B01D 2201/305 (2013.01); B01D 2201/34 (2013.01); B01D 2201/4007 (2013.01); B01D 2201/4084 (2013.01); F02M 37/221 (2013.01)

(58) Field of Classification Search
CPC ...... B01D 29/117; B01D 29/15; B01D 29/19; B01D 29/23; B01D 29/27; B01D 29/58; B01D 29/88; B01D 29/111; B01D 33/70; B01D 35/00; B01D 35/02; B01D 35/005; B01D 35/14; B01D 35/153; B01D 35/16; B01D 35/28; B01D 35/30; B01D 35/301; B01D 35/306; B01D 35/147; B01D 35/185

See application file for complete search history.

(56) References Cited

FOREIGN PATENT DOCUMENTS

| | | |
|---|---|---|
| DE | 10 2008 020 233 | 10/2009 |
| GB | 2 390 825 | 1/2004 |

FILTER DEVICE WITH RELEASABLY SECURABLE END CAP AND SEALING ARRANGEMENT

REFERENCE TO RELATED APPLICATION

This application is a continuation application of U.S. patent application Ser. No. 13/261,414 filed Aug. 30, 2012, the entire subject matter of which is hereby incorporated by reference.

FIELD OF THE INVENTION

The invention relates to a filter device for fluids, in particular for fuels, such as diesel oil. The filter device comprises a filter housing, defining a longitudinal axis. The filter housing has housing connections in the form of a fluid inlet and a fluid outlet and can accommodate at least one filter element. During the filtration operation, the fluid can flow through a filter medium enclosing an inner filter cavity. The filter element is enclosed by an end cap on the filter element's lower end facing the bottom part of the filter housing. The end cap comprises a passage forming a fluid connection to the inner filter cavity and can be secured on an element retainer of the filter housing. The invention also relates to a filter element for use in that filter device.

BACKGROUND OF THE INVENTION

Filter devices of this type are known from the prior art. Such filter devices are typically used in fuel systems for internal combustion engines to protect sensitive components, in particular the injection systems, against degradation due to impurities entrained in the fuel. To guarantee that the systems downstream of the filter will operate without any trouble over their entire service life, the filter device has to satisfy high reliability requirements. The operational reliability is greatly affected by the properties of the connection between the end cap and the element retainer. The filter element under consideration has to be accurately positioned in the filter housing by the element retainer. A reliable, tightly sealed fluid connection to the filter cavity must be formed. In addition, when changing the filter element during the ongoing operations, a flawless connection between the end cap and the element retainer when the new filter element is installed must be ensured.

SUMMARY OF THE INVENTION

An object of the present invention is to provide an improved filter device that is especially suited to meet the requirements under consideration with respect to the operating behavior.

The present invention basically achieves this object with a filter device having an element retainer that has, according to the invention, a retaining piece located on the bottom part of the filter housing and open in the direction of the filter element. A fluid channel leading to a housing connection empties into the retaining piece, with the end cap of the filter element having a connecting piece. The cap connecting piece can be accommodated in the retaining piece and can be secured therein over a support zone having an axial length. In addition, the retaining piece has an opening forming a fluid connection to the fluid channel emptying into the element retainer and has a seal arrangement sealing off the opening from the open end of the retaining piece. Since the filter element is secured in the element retainer by the connecting piece of the end cap over a support zone that extends over an axial longitudinal area, the filter element is guaranteed to be perfectly positioned and secured in its place in the filter housing. Secondly, the connecting piece forms a fluid duct in interaction with the retaining piece of the element retainer by the opening in the connecting piece. This fluid duct connects the inner filter cavity to the assigned housing connection, so that a reliably sealed fluid path is formed by the seal arrangement at the connecting piece. When the connecting piece is inserted into the retaining piece of the element retainer, the result is a reliable coupling between the end cap of the filter element and the element retainer during replacement operations of the filter element.

Preferably, the axial length of the support zone is not less than one-fourth of the diameter of the retaining piece.

The coupling between the end cap and the element retainer is designed to be very easy and reliable, if, according to an advantageous exemplary embodiment, the interior of the retaining piece has an insertion chamfer that diverges in the direction of the open end.

Especially advantageously, the seal arrangement is formed by sealing elements arranged on the exterior of the connecting piece at an axial distance from each other that defines the length of the support zone. These sealing elements secure the connecting piece in the element retainer by resting against the interior of the retaining piece of the element retainer.

A particular advantage is that the connecting piece of the end cap can have a closed bottom on its end that is to be accommodated in the element retainer. In this case, the opening leading to the fluid channel is located in the wall of the connecting piece above this bottom. As a result, the connecting piece forms with its closed lower end a collecting space between the bottom and the opening located in the wall. Any residual fluid that may have dripped out of the inner filter cavity when the filter element was removed remains in this collecting space. The risk of polluting the environment during removal of a filter element is then reduced.

Especially preferably, the retaining piece of the element retainer is also closed on its lower end by a bottom that forms a depression as the lowest point of the filter housing. As a result, a collecting space for the residual fluid that drips off during the changing of the filter, or for any dirt particles that may fall off is formed in the bottom part of the filter housing. In this case, these substances remain collected at the lowest point of the housing, that is, below the fluid channel that leads from the element retainer to the associated housing connection.

Preferably, during the filtration operation, the fluid can flow through the filter medium of the filter element from its outer unfiltered side to the inner filter cavity forming the clean side. The fluid channel emptying into the retaining piece of the element retainer then leads to the housing connection that serves as the fluid outlet.

The subject matter of the invention is also a filter element for use in a filter device.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
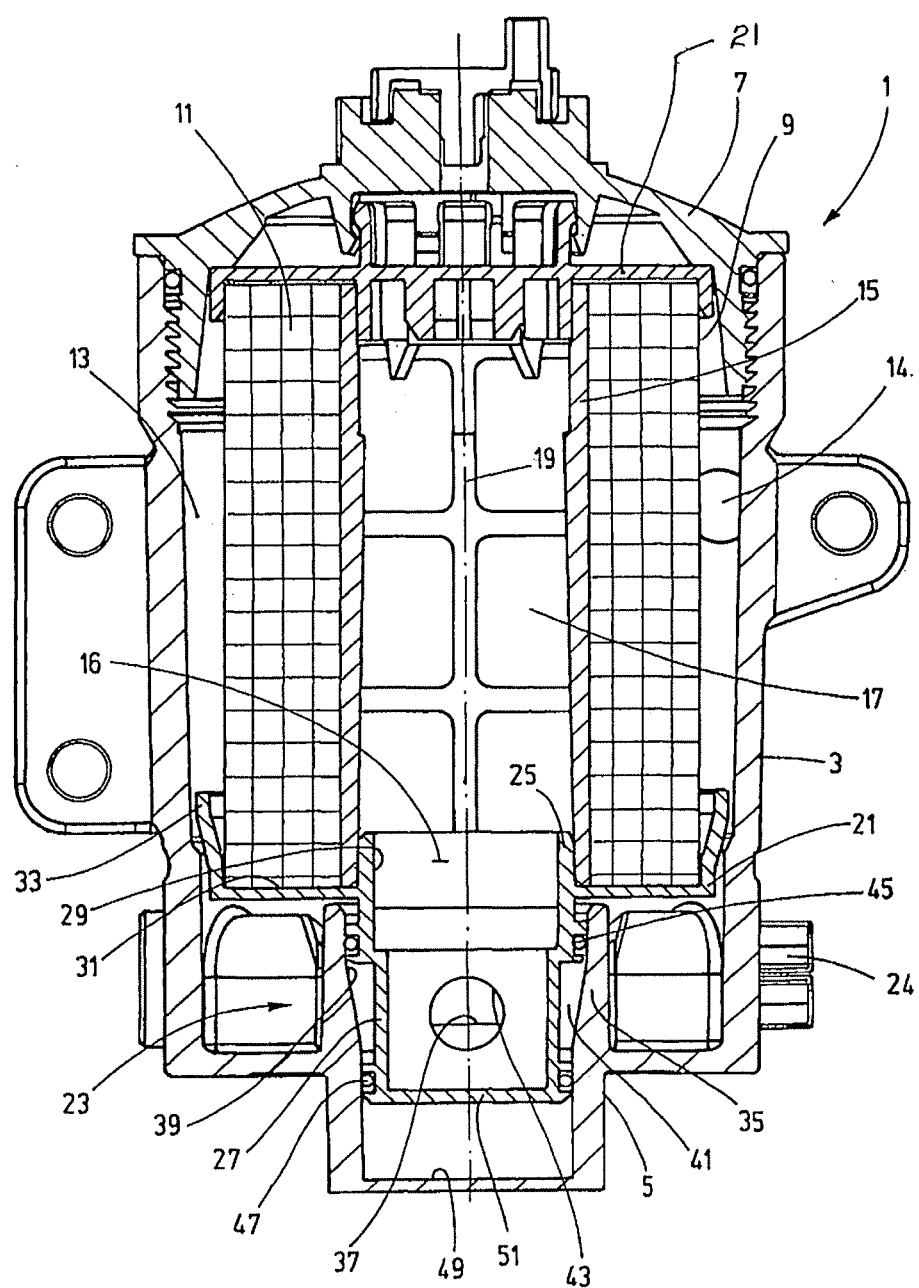
FIG. 1 is a side elevational view in section of filter according to an exemplary embodiment of the invention.

The filter device has a filter housing 1 comprising a main part 3 in the form of a hollow cylinder and a closed bottom part 5 connected to the underside of the main part. At the upper end, a housing cover 7 is screwed to the main part 3. This housing cover can be removed for the purpose of installing and removing a filter element 9. In the exemplary embodiment to be described herein, the filter element 9 can be traversed by flow from the outside to the inside. An intermediate space is located between the exterior of the filter element 9, accommodated in the housing 1, and the inner wall of the housing 1 and forms the unfiltered side 13 during the filtration operation. A housing connection 14 leads in the direction of the unfiltered side 13 and forms the fluid inlet. The filter medium 11 of the filter element 9 is formed by a filter mat, formed into a hollow cylinder. This filter mat surrounds a fluid-permeable support tube 15 forming an inner filter cavity 17 forming the clean side 16, in which the cleaned fluid may be found, during the filtration operation.

The respective end of the filter element is provided in the conventional manner with end cap 21 that forms enclosures for the filter medium 11 and the support tube 15. The lower end cap 21 that locates the filter element 9 in the functional position in the housing 1, can be secured in the housing 1, forms both the anchoring element anchoring the filter element 9 in an element retainer 23 on the bottom part 5 of the filter housing 1, and forms a fluid-conducting device for providing a fluid connection between the inner filter cavity 17 and the housing connection 24 forming the fluid outlet in the illustrated example. For this purpose, the lower end cap 21 has a connecting piece 27 forming a passage 29 in the direction of the inner filter cavity 17. The connecting piece 27 extends from the end cap bottom 31 forming a flat support face for the lower edge of the filter medium 11, both axially upward with a tube section 25 into the filter cavity 17 and axially downward away from the end cap bottom 31 The axial length of this downwardly extending part is larger than the diameter of the tube section 25. The interior of the support tube 15 rests against the exterior of the tube section 25 of the connecting piece 27 that projects into the filter cavity 17. The end cap 21 forms, with the outer circumferential edge 33 of the end cap bottom 31, the outer enclosure of the filter medium 11.

The element retainer 23 has a retaining piece 35 on the bottom part 5 of the filter housing 1. This retaining piece is open on the upper end facing the filter element 9 and accommodates the connecting piece 27 of the filter element 9 located in the functional position. The lower end of the retaining piece 35 is closed by a bottom part 49. Above the bottom part 49, a fluid channel 37, that leads to the fluid outlet 24 and that extends transversely to the longitudinal axis 19 of the filter housing 1, empties into the retaining piece 35 of the element retainer 23. The interior of the retaining piece 35 of the element retainer 23 forms an insert chamfer 39 that diverges in the direction of the open end of the retaining piece 35 and that facilitates the insertion of the connecting piece 27 into the element retainer 23. The part of the connecting piece 27 of the end cap 21 accommodated in the retaining piece 35 is stepped in the outside diameter such that a fluid space 41, into which the fluid channel 37 empties, is formed between the retaining piece 35 and the connecting piece 27.

In the illustrated example, the axial length of the part of the connecting piece 27 that can be accommodated in the retaining piece 35 is equal to approximately half the size of the diameter of the opening of the retaining piece 35. The wall of the retaining piece 27 has an opening 43 connecting the interior of the connecting piece 27 and, by the passage 29, the filter cavity 17 to the fluid outlet 24 by the fluid channel 37. As a result, a fluid duct is formed by the connecting piece 27 of the lower end cap 21 from the clean side 16, located in the filter cavity 17, to the fluid outlet 24. The fluid space 41 is sealed by seals 45 and 47 in the direction of the interior of the retaining piece 35 of the element retainer 23. These seals are located on the exterior of the connecting piece 27 at an axial distance from one another. A support zone is then formed proportionate to a large axial length for the purpose of supporting the connecting piece 27 in the retaining piece 35.

Figure 2:
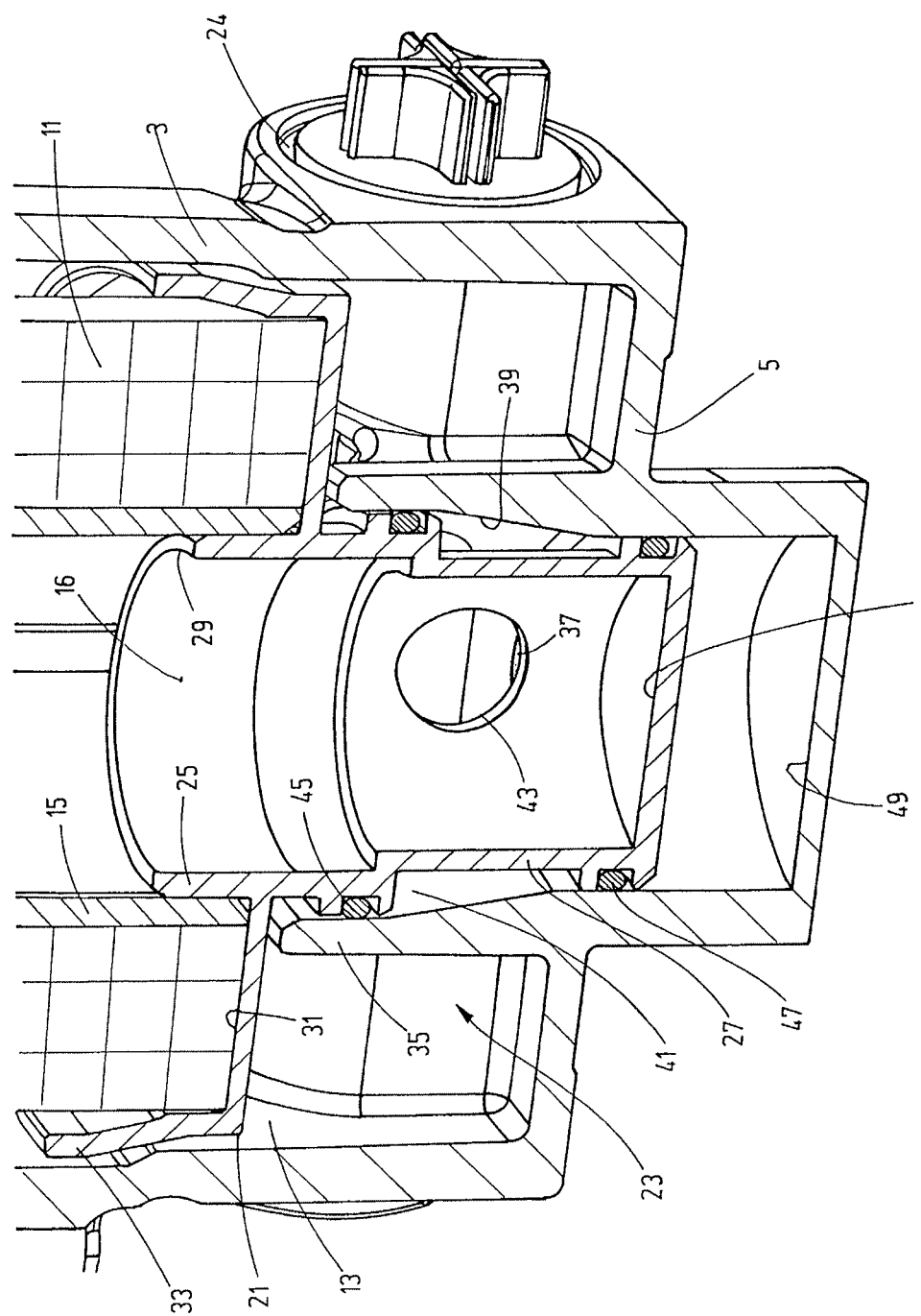
FIG. 2 is an enlarged partial perspective view in section of the subregion of the filter device of FIG. 1 adjacent to the element retainer of the filter housing.

In the illustrated example, the axial length of this support zone is equal to about one-half of the diameter of the opening of the retaining piece 35. Since this support zone extends over an axial region and has a length that can also be smaller or larger than one-half of the opening diameter of the retaining piece 35, a secure fit of the filter element 9 in the element retainer 23 is guaranteed. Owing to the seals 45, 47, a seal is formed simultaneously between the clean side 16, to which the sealed fluid space 41 also belongs, and the above opposite unfiltered side 13 located in the main part 3 of the housing 1. At the same time, the sealing ring 45 is provided with a larger diameter than the sealing ring 47. The wall 39 (insert chamfer) tapering downward in the form of a cone in the direction of FIG. 2, extends, when viewed in the installed state of the filter element, between the two seals 45 and 47. The seals are in contact with the cylindrical wall sections connected at the top and the bottom of the insert chamfer 39. Owing to this arrangement, no otherwise conventional seal is needed between the outer circumferential edge 33 of the lower end cap 21 and the inner wall of the housing. A seal arrangement having a correspondingly large diameter can be omitted. Instead, sealing elements of smaller diameter in the form of O-rings as the seals 45 and 47 at the connecting piece 27 can be used. As a result, less physical effort is required for installation, and the costs are lower, while at the same time the operational reliability is improved.

In the illustrated example, the lower end of the retaining piece 35 of the element retainer 23 forms with the closed bottom part 49 the lowest point at the bottom part 5 of the filter housing 1. When the filter element 9 that is to be changed is removed, the resulting closed bottom depression of the housing 1 forms a receiving space for any residual fluid that may have dripped off or for any dirt particles that may have fallen off. Therefore, these substances stay in a "safe zone" below the fluid channel 37 leading to the fluid outlet 24. The connecting piece 27 of the end cap 21 is also closed on the lower end, lying opposite the filter cavity 17, by a bottom part 51. As is evident from the figures, the opening 43, continuing the fluid path over the fluid channel 37 to the fluid outlet 24, is located in the wall of the connecting piece 27 above this bottom part 51. A receiving space is then also formed inside the connecting piece 27. In this case, the residual fluid that under some circumstances may drip out of the inner filter cavity 17 when the filter element 9 is removed, stays inside this space formed at the end cap 21. When the filter element 9 is taken out, no residual fluid can then drip off the closed lower end of the filter element 9 and pollute the environment. Counter to the described direction of flow, the filter device can also be operated, if necessary, with minor structural alteration measures, in the opposite direction of flow.

While one embodiment has been chosen to illustrate the invention, it will be understood by those skilled in the art that various changes and modifications can be made therein without departing from the scope of the invention as defined in the appended claims.

What is claimed is:

1. A filter device for fluids, comprising:
   a filter housing defining a longitudinal axis, having housing connections of a fluid inlet and a fluid outlet, and having a bottom part;
   a filter element accommodated in said filter housing, said filter element having a filter medium through which the fluid can flow during a filtration operation and connected in fluid communication with said fluid inlet and said fluid outlet, said filter medium surrounding an inner filter cavity;
   an element retainer being in said filter housing and having a retaining piece located on said bottom part, said retaining piece having an open end in a direction of said filter element and having an interior surface with a first cylindrical section and with an insertion chamfer diverging in a direction of said open end thereof and extending from said first cylindrical section;
   a fluid channel leading to one of said housing connections and ending in said retaining piece;
   an end cap enclosing a lower end of said filter element facing said bottom part, said end cap including a passage having a fluid connection to said inner filter cavity and being releasably secured on said element retainer, said end cap having a connecting piece received in said retaining piece and secured in a support zone of said retaining piece, said connecting piece having an opening connected in fluid communication with said fluid channel to connect said fluid channel to one of said housing connections; and
   a first seal on an exterior of said connecting piece and engaging said first cylindrical section of said retaining piece in said support zone sealing said opening from said open end of said retaining piece.

2. A filter device according to claim 1 wherein
   a second seal is on said exterior of said connecting piece, is axially spaced from said first seal along said longitudinal axis and engages a second cylindrical section on said interior surface of said retaining piece extending from an end of said insert chamfer remote from said first cylindrical section.

3. A filter device according to claim 2 wherein
   said first seal and said first cylindrical section have diameters transverse to said longitudinal axis greater than diameters of said second seal and said second cylindrical section transverse to said longitudinal axis.

4. A filter device according to claim 3 wherein
   said first and second seals are axially spaced from one another along said longitudinal axis at a distance substantially equal to an axial length of said support zone.

5. A filter device according to claim 2 wherein
   said first and second seals are axially spaced from one another along said longitudinal axis at a distance substantially equal to an axial length of said support zone.

6. A filter device according to claim 1 wherein
   said support zone has an axial length equal to at least one-fourth of a diameter of said opening of said retaining piece.

7. A filter device according to claim 1 wherein
   said connecting piece of said end cap comprises a closed bottom on an end thereof accommodated in said element retainer; and
   said opening is located in a side wall of said connecting piece extending above said closed bottom thereof and parallel to said longitudinal axis, said opening extending perpendicular to said longitudinal axis.

8. A filter device according to claim 1 wherein
   said retaining piece of said element retainer is closed on a lower end thereof by a closed bottom, said bottom forming a depression and being a lowest point of said filter housing.

9. A filter device according to claim 1 wherein
   fluid flows through said filter medium from an outer unfiltered side to an inner filtered side and into said inner filter cavity during the filtration operation, said outer unfiltered side being connected in fluid communication with said fluid inlet, said inner filtered side being connected in fluid communication with said fluid outlet; and
   said fluid channel is connected to said fluid outlet in fluid communication.

10. A filter device according to claim 9 wherein
    said connecting piece extends from a bottom of said end cap in a direction away from said filter medium.

* * * * *